INVENTORS
RICHARD W. BENNETT
HANS Y. JULIUSBURGER
BY [signature]
ATTORNEY

Jan. 30, 1968 R. W. BENNETT ET AL 3,366,930

METHOD AND APPARATUS FOR REJECTING NOISE IN A DATA TRANSMISSION SYSTEM

Filed March 1, 1965 2 Sheets-Sheet 2

3,366,930
Patented Jan. 30, 1968

3,366,930

METHOD AND APPARATUS FOR REJECTING NOISE IN A DATA TRANSMISSION SYSTEM

Richard W. Bennett, Yorktown Heights, and Hans Y. Juliusburger, Putnam Valley, N.Y., assignors to International Business Machines Corporation, New York, N.Y., a corporation of New York Filed Mar. 1, 1965, Ser. No. 436,090
14 Claims. (Cl. 340—172.5)

This invention relates to a receiver for a data transmission system and more particularly to a scheme for rejecting noise applied to such a receiver.

In semi and fully automated industrial facilities, it is generally required that information from various remote terminals be applied to a central data collecting station. Since this information is used for production planning, payroll, facility monitoring, and other critical functions, it is important that the data received at the central station be as accurate as possible. One source of errors in such a system is noise (i.e., spurious signals) which appears on the lines interconnecting the remote terminals and the central station. While it is possible by careful design to reduce the amount of this noise, it is virtually impossible to eliminate it. Various schemes have therefore been devised to assist the receiver at the central station in distinguishing between noise and data on the lines.

One scheme which is frequently employed is to provide filters at the receiver which pass only the data signals. However, filters are very expensive and are of little value over long lines. Another scheme makes use of the fact that, because of such factor as contact bounce, most noise pulses occur near the point where the level on the monitored terminal changes from one state to the other. A predetermined number of samples around the transitions are ignored, giving things a chance to settle. This scheme is, by its nature, only partially effective in noise reduction and substantially increases the response time of the receiver.

A more effective scheme for distinguishing between noise and data is to sample the input applied to the receiver at a rate considerably in excess of that at which the data changes at the remote terminal and to then require that a majority of a predetermined number of the samples be of a particular state before a change in state is recognized. This majority logic scheme gives fairly good results where the input pulses are synchronous and of known duration, as in telegraph signals. However, even with this sort of an input, errors may occur at the pulse transitions even with a fairly low noise level on the line. The majority logic scheme described above is particularly weak in handling asynchronous, variable length inputs such as might be generated in an industrial-facility-monitoring system.

It is therefore a primary object of this invention to provide an improved scheme for rejecting noise at the receiver of a data transmission system.

A more specific object of this invention is to provide an improved majority logic scheme for rejecting noise at the receiver of the data transmission system.

Another object of this invention is to provide a scheme for rejecting noise at the receiver of a data transmission system in which information is generated as asynchronous variable length pulses.

Another object of this invention is to provide a scheme which is capable of distinguishing between data and noise at pulse transitions even with a relatively high noise level on the line.

A further object of this invention is to provide a scheme of the type described above which is capable of operating with a multiplex sampling system.

A still further object of the invention is to provide a scheme of the type described above which is inexpensive to build and operate and which does not cause a significant increase in the response time of the receiver.

In accordance with these objects, this invention provides a receiver for a data transmission system which receiver accepts samples taken of the transmitted data at a uniform rate. The sampling rate is sufficiently great that at least a predetermined number of samples will be taken on any data pulse. The receiver also includes a register in which the last stable state determined for the received data is stored and a plurality of registers in which a predetermined number of the most recent samples are stored. After each new sample of the data is received, a determination is made as to the state of a predetermined fraction of the stored samples, generally a majority, and the state of this fraction of the samples is compared to that stored in the last stable state register. If these two states are the same, nothing further happens. If these states are not the same, then the new stable state is stored in the last stable state register and an inhibit circuit energized which prevents the contents of the last stable state register from being altered for a fixed number of subsequent samples.

The foregoing and other objects, features, and advantages of the invention will be apparent from the following, more particular description of a preferred embodiment of the invention as illustrated in the accompanying drawings.

GENERAL DESCRIPTION

Figure 1:
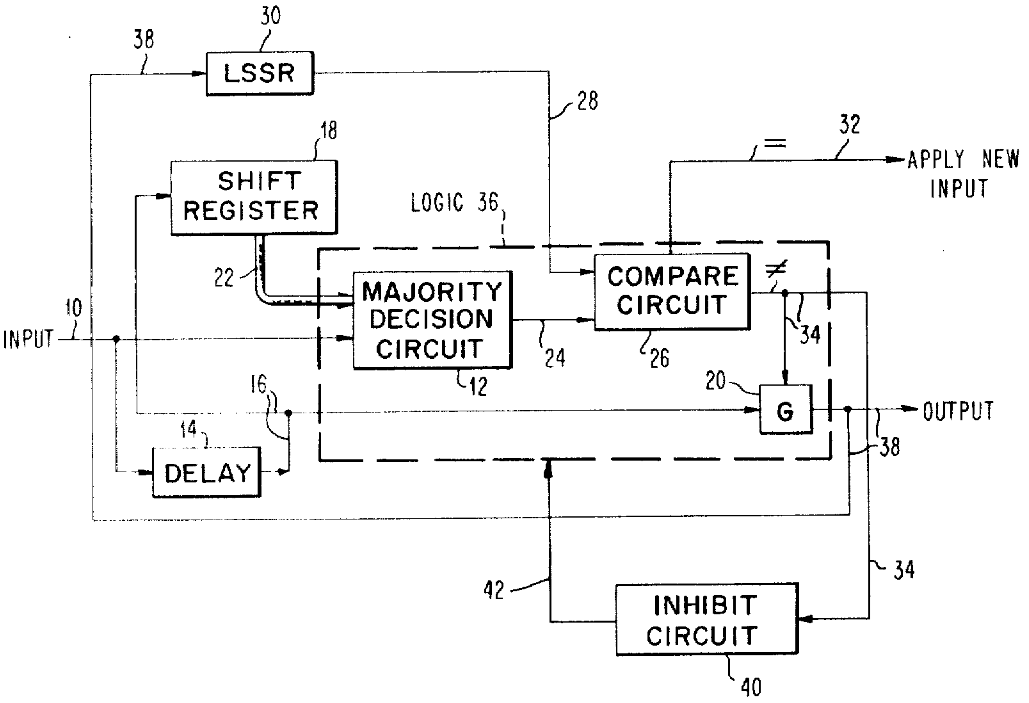
FIG. 1 is a generalized block diagram of the noise rejecting receiver of this invention.

Referring now to FIG. 1, it is seen that circuit input line 10 is connected directly to majority-decision circuit 12 and through short delay 14 and line 16 to shift register 18 and the information input of gate 20. The signals appearing on line 10 represent samples taken at a predetermined rate on the element or pulses being monitored. This may be accomplished either by sampling the element at the transmitter and transmitting only samples through line 10, or by transmitting pulse levels and placing a sampler in the receiver with line 10 as its output. A predetermined number, N, of the previous samples appearing on line 10 are stored in shift register 18. Output lines 22 from shift register 18 are connected as the other inputs to majority-decision circuit 12. Circuit 12, when energized, generates a signal on line 24 which is the same as that appearing on a majority of the lines 10 and 22. Line 24 is connected as one input to compare circuit 26. The other input to compare circuit 26 is output line 28 from last stable state register (LSSR) 30. LSSR30 is always set to the last stable state determined from the samples applied to line 10. If the inputs applied to compare circuit 26 are equal, there is an output on equal line 32 which is applied to cause a new sample to be applied to input line 10 in a manner not shown. If the inputs applied to compare circuit 26 are not equal, there is an output on not-equal line 34 which is applied as a conditioning input to gate 20 and as the energizing input to inhibit circuit 40.

Majority-decision circuit 12, gate 20, and compare circuit 26 form the basic components of logic circuit 36. Output line 38 from gate 20 is connected as the circuit output line and as the input to LSSR30. Output line 42 from inhibit circuit 40 is connected as an input to logic circuit 36. The time period that inhibit circuit 40 is energized to apply a signal to line 42 is generally equal to the time required to apply the next $N/2$ or $(N/2)+1$ samples to the circuit. The reason for this will be apparent later. Line 42 may either be connected to gate 20 to inhibit an output therefrom for the indicated number of sample cycles after a change is detected, or it may be applied to compare circuit 26 to inhibit the compare operation during these sample cycles.

GENERAL OPERATION

Figure 2:
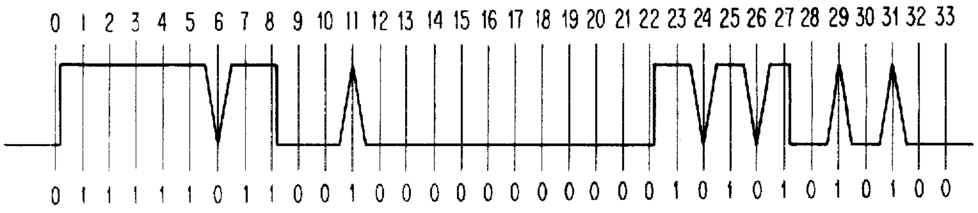
FIG. 2 is a pulse diagram of the type of input which might be applied to the receiver.

FIG. 2 shows a pulse pattern such as might appear at the receiver of a data transmission system. This pulse pattern would be sampled, for example, at the receiver, at intervals indicated by the numbered lines in FIG. 2. The results of the samples, as shown in binary notation at the bottom of FIG. 2, are applied to line 10 (FIG. 1). From FIG. 2, it can be seen that a first input pulse appears just after the 0 sample and lasts through the 8th sample. A negative noise spike appears during the 6th sample of this pulse. Similarly, a positive noise spike appears during the 11th sample. A new positive pulse occurs just after the 22nd sample and lasts through the 27th sample. This pulse has negative spikes appearing in it during the 24th and 26th samples. Positive noise spikes occur during the 29th and 31st samples.

Assume that majority logic is being used to distinguish between signal and noise in the input shown in FIG. 2 and a decision is made on the basis of 3 out of 5 samples. A decision will therefore be made on sample 3 that a positive pulse has occurred. The circuit then continues to look at the five most recent samples until sample 10 is received. At this time, the majority of the five most recent samples indicates a 0 pulse level. The transition which occurred just after sample 8 is in this manner recognized. However, the noise spike at sample 11 causes the majority of the five most recent samples to again be a 1 bit. Therefore if straight majority logic is used to distinguish between signal and noise, a spurious indication is generated at this time that a 1 bit has been received. This is true even though there is less than 20% noise on the line. When the 12th sample is taken, the majority of the samples is again 0 and another spurious indication is generated that a 0 bit has been received, when in fact all that has occurred is that a noise pulse has terminated. A second pulse is received just after the 22nd sample and is recognized by a straight majority logic circuit at the 25th sample. This pulse terminates just after the 27th sample. However, due to the noise pulse at the 26th sample and the 29th sample, this down level is not recognized until the 30th sample. A noise pulse at the 31st sample then causes an erroneous determination that a new 1 bit has been received, if ordinary majority logic sampling techniques are employed, and, when the 32nd sample is received, a spurious indication that a new 0 bit has been received is generated.

It can therefore be seen that with as little as 20% noise on the line, erroneous indications can be generated when ordinary majority logic techniques are employed. The manner in which the circuit shown in FIG. 1 operates to improve upon ordinary majority logic techniques to eliminate the above problem will now be described.

Referring to FIG. 1, it is seen that a sample applied to input line 10 is applied to one input of majority-decision circuit 12 in logic circuit 36. At this time, shift register 18 contains the N most recent samples on line 10 and last stable state register (LSSR) 30 is set to the last stable state determined for the signal being monitored. The number of positions in (and therefore the number of previous samples stored by) shift register 18 is generally an even number so that the total number of inputs to majority-decision circuit 12 is an odd number, thereby permitting a majority decision to always be made. The signal applied by majority-decision circuit 12 through line 24 to compare circuit 26 is the same as that of a majority of the samples applied to circuit 12 through lines 10 and 22. The other input to compare circuit 36 is the last stable state stored in register 30. If this last stable state and the majority of the samples are the same, then nothing further need be done and compare circuit 26 generates an output signal on line 32 which causes a new sample to be applied to line 10 in a manner not shown in FIG. 1.

If, on the other hand, the inputs to compare circuit 26 are not equal, a signal appears on line 34, conditioning gate 20 to pass the signal on line 16 to output line 38 and energizing inhibit circuit 40. A signal appears on line 16 a sufficient period of time after the input signal is applied to line 10 to permit the required operations to be performed in circuits 12 and 26. A signal on line 16 is also applied to shift register 18, causing a shift operation which results in the oldest sample therein being shifted out of the register. The signal on line 38, in addition to being applied to the receiver output line, is also applied to change the state of LSSR30 to that of a majority of the samples applied to circuit 12. The energizing of circuit 40 prevents a signal from being applied to output line 38 during the circuit cycles resulting from a predetermined number of subsequent samples being applied to line 10. As indicated previously, this may be accomplished either by inhibiting the operation of compare circuit 26 or by blocking gate 20. The signal on line 42 does not, however, prevent new inputs from being applied to line 10 and being stored in shift register 18. After the predetermined number of such additional inputs have been stored in shift register 18, inhibit circuit 40 is deactivated, permitting normal operation of the circuit to resume.

Referring now to FIG. 2, and assuming first, that 3-out-of-5 majority logic is being employed, second, that LSSR30 is initially set to its 0 state, and third, that inhibit circuit 40 remains operative for two cycles after it is energized, it is seen that outputs would appear on line 32 until the third sample appears on line 10. At this time, the majority of the inputs to circuit 12 are 1 bits, causing a 1 output on line 24. The resulting mismatch in compare circuit 26 causes an output on line 34 which conditions gate 20 to pass a 1 bit to output line 38 and energizes inhibit circuit 40. The signal on line 38 is applied to set a 1 bit into LSSR30, and the output signal on line 42 from inhibit circuit 40, which circuit it has been assumed remains energized for two cycles, prevents a signal from being applied to line 38 during samples 4 and 5. In this instance, this precaution is unnecessary since no output would appear on this line during these two samples even if straight majority logic is employed.

When the 10th sample is applied to input line 10, a majority of the inputs to circuit 12 are now 0, causing a 0 output on line 24, which, coupled with the 1 input on line 28 from LSSR30, causes an output signal on line 34 from compare circuit 26. As before, the signal on line 34 energizes gate 20 to pass the 0 bit on line 10 to output line 38 and to store this bit in LSSR30 and also energizes inhibit circuit 40. The resulting output signal on line 42 inhibits an output signal from being applied to line 38 during samples 11 and 12. It can be seen that this capability is now significant since the change in state which was previously detected during sample 11 when an ordinary majority logic circuit was employed is now suppressed and the spurious recognition of a 0 pulse which occurred during sample 12 when ordinary majority logic was employed is likewise suppressed. By sample 13, the unstable condition which occurred at the pulse transition has subsided and ordinary operation may be resumed.

The previous discussion indicated how the circuit was capable of giving accurate results with a 20% noise error on the line. The inputs which occur between samples 22 and 32 have a 40% nose error. When sample 25 is applied to the circuit, a change in state to a 1 level is recognized in a manner identical to that described when sample 3 occurred and a suitable output signal appears on line 38. Inhibit circuit 40 is also energized at this time; however, its function is not required in this instance. When the 30th sample is applied to the circuit, a change in state to a 0 level is recognized by the circuit in the same manner as for the 10th sample previously described, the state of LSSR30 is changed to a 0 bit, and two-cycle inhibit circuit 40 is again energized. The energizing of this circuit prevents spurious outputs from being generated during samples 31 and 32.

It can therefore be seen that the circuit shown in FIG. 1 is capable of accurately distinguishing between signal and noise even with as much as 40% noise on the line. The only restrictions on the system are that the duration of any pulse be sufficient for at least M samples to be taken on where M is the base of majority logic being employed, and that there be less than $M/2$ noise samples in any M consecutive samples. For the example described above where 3-out-of-5 majority logic is employed, M would be 5 so that each pulse would have to last for at least 5 samples and there could be no more than 2 noise signals in any 5 consecutive samples.

DETAILED CIRCUIT DESCRIPTION

Figure 4:
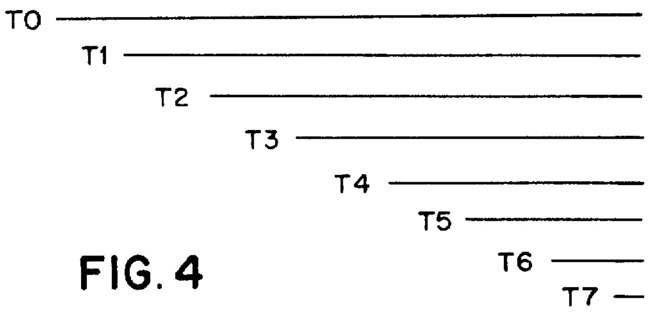
FIG. 4 is a chart illustrating the clock times for the embodiment of the invention shown in FIG. 3.
Figure 3:
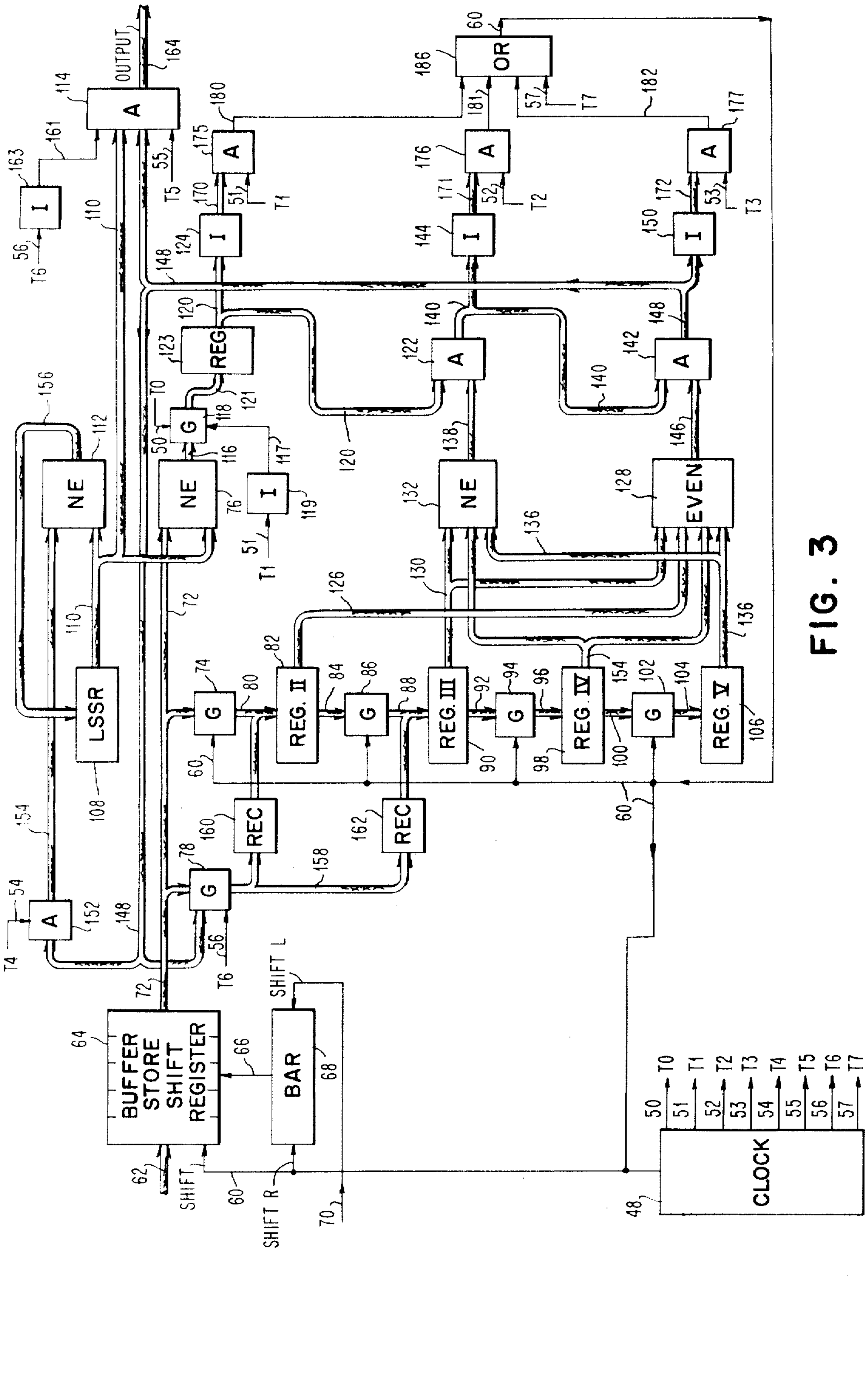
FIG. 3 is a block diagram of a preferred embodiment of the noise rejecting receiver of this invention.

Referring now to FIG. 3, it is seen that the preferred embodiment of this invention includes a clock 48 having eight output lines 50–57 respectively. The timing signals on lines 50–57 are designated TO–T7 respectively. The various places in the circuit which the lines 50–57 are connected to will be described later. The duration of the timing pulses appearing on lines 50–57 are shown in FIG. 4. The clock continues to run with pulses appearing on the lines as shown in FIG. 4 until a restart signal is applied to line 60. A short period of time after this occurs, the timing pulses on all the lines cease and the new T0 pulse appears on line 50.

Pulse samples are applied to the receiver through lines 62. There would be as many lines 62 as there are multiplexed channels being monitored. The samples on lines 62 are applied in parallel to buffer-store shift register 64. Each level of register 64 has as many bit positions as there are multiplexed channels being monitored. The particular level in which a group of samples applied to register 64 are stored is determined by output line 66 from buffer address register (BAR) 68. BAR68 has a number of bit positions equal to the number of levels in register 64 and has a bit stored in adjacent to the level in which a new set of samples is to be stored in register 64. Each time a new set of samples is applied to register 64, a signal is applied line 70 causing the bit in BAR68 to be shifted one position to the left. A signal on line 60, in addition to restarting clock 48, is also applied to shift the samples stored in register 64 one level to the right and to shift the bit in BAR one position to the right.

Output lines 72 from register 64 are connected as the information inputs to gates 74 and 78, and as one set of inputs to not-equal circuit 76. Output lines 80 from gate 74 are connected as the information inputs to register II 82. Output lines 84 from register II are connected as the information inputs to gate 86. Output lines 88 from gate 86 are connected as the inputs to register III 90. Output lines 92 from register III are connected as the information inputs to gate 94. Output lines 96 from gate 94 are connected as the information inputs to register IV 98. Output lines 100 from register IV are connected as the information inputs to gate 102. Output lines 104 from gate 102 are connected as the inputs to register V 106. Each of the registers II–V has a number of bit positions equal to the number of multiplexed channels being monitored. The conditioning input to gates 74, 86, 94 and 102 is the beforementioned line 60.

The circuit of FIG. 3 also has a last stable state register (LSSR) 108 with a bit position for each of the channels being monitored. The bit positions in this register are set at any given time to the last stable state detected on the corresponding one of the channels. Output lines 110 from LSSR are connected as one set of inputs to not-equal circuit 112 and AND gates 114, and as the other set of inputs to beforementioned not-equal circuit 76. Not-equal circuits 76 and 112 each contain a plurality of individual circuits which circuits accept two inputs, one from each of the set of inputs applied to the not-equal circuit, and generate an output signal only if the two inputs applied to them are not the same. The not-equal circuits may, for example, each be a bank of exclusive OR gates. Output lines 116 from not-equal circuit 76 are connected as the information inputs to gates 118, the conditioning inputs to each of these gates being T0 line 50 and output line 117 from inverter 119. The input to inverter 119 is T1 line 51. Output lines 121 from gates 118 are connected as the inputs to storage register 123, there being a position in storage register 123 for each channel being monitored. Output lines 120 from register 123 are connected as one set of inputs to AND gates 122 and as the inputs to inverters 124.

Output lines 126 from register II are connected as one set of inputs to even-circuit 128. Output lines 130 from register III are connected as one set of inputs to not-equal circuit 132 and as the second set of inputs to even-circuit 128. Output lines 134 from register IV are connected as the second set of inputs to not-equal circuit 132 and as a third set of inputs to even-circuit 128. Output lines 136 from register V are connected as the final set of inputs to not-equal circuit 132 and even-circuit 128. Not-equal circuit 132 is in fact a plurality of individual circuits, each of which accepts three inputs, the inputs being the corresponding lines from each of the sets of inputs applied to circuit 132, and generates an output signal only when the three inputs applied to it are not the same. Even-circuit 128 is in fact a plurality of individual circuits, each of which has four inputs, the inputs being the corresponding lines from each of the four sets of inputs applied to the circuit, and each of which generates an output only when an even number of the inputs applied to it are of the same state.

Output lines 138 from not-equal circuit 132 are connected as a second set of inputs to AND gates 122. Output lines 140 from AND gates 122 are connected as one set of inputs to AND gates 142 and as the inputs to inverters 144. Output lines 146 from even-circuit 128 are connected as the other set of inputs to AND gates 142. Output lines 148 from AND gates 142 are connected as the inputs to inverter 150, as one set of inputs to AND gates 114 and 152, and as a conditioning input to gates 78. The other input to each of the AND gates 152 is T4 line 54. Output lines 154 from AND gates 152 are connected as the other set of inputs to not-equal circuit 112. Output lines 156 from not-equal circuit 112 are connected as the inputs to LSSR108. A second conditioning input to each of the gates 78 is T6 line 56, and a second input to each of the AND gates 114 is T5 line 55. Output lines 158 from gates 78 are connected through rectifiers 160 and 162 respectively to the inputs of register II and register III. The final input to each of the AND gates 114 is output line 161 from inverter 163. The input to inverter 163 is T6 line 56. Output lines 164 from AND gates 114 are the circuit output lines.

Output lines 170–172 from inverters 124, 144, and 150 respectively are connected as inputs to AND gates 175–177. The other inputs to AND gates 175–177 are T1 line 51, T2 line 52, and T3 line 53 respectively. Output lines 180–182 from AND gates 175–177 respectively are connected as three of the inputs to OR gate 186. The other input to OR gate 186 is T7 line 57. The output from OR gate 186 is beforementioned line 60.

DETAILED DESCRIPTION OF OPERATION

The nature of the circuit shown in FIG. 3 has been dictated by certain assumptions which were made during its design. First, it was decided that a 3-out-of-5 majority logic would be employed. Second, it was decided that input samples from a plurality of remote terminals would be collected in some standard manner not shown and applied in parallel through lines 62 to buffer store 64. Third, it was decided that changes in the state of LSSR108 and an output on a line 164 for a given terminal would be inhibited for two sample cycles after each change detected at the terminal. Finally, it was decided that an output would be generated on one of the lines 164 only when a determination has been made that the level at the corresponding terminal has changed from a 0 to a 1.

Referring now to FIG. 3, assume that a certain number of samples from each of the terminals being monitored are stored in buffer store 64 and that a signal has just been applied to line 60, causing (1) a new set of samples to be applied to the right-most position in buffer store 64 and therefore to line 72 and (2) the restarting of clock 48. The four sets of samples preceding that now applied to line 72 are at this time stored in registers 82, 90, 98 and 106 respectively. The samples on lines 72 are applied to one input of not-equal circuit 76 where they are compared with the last stable states determined for the corresponding terminals being applied to circuit 76 through lines 110 from LSSR108. For any one of the terminals where these two values are not equal, a signal appears on the corresponding line 116. The restarting of clock 50 causes a signal to appear on T0 line 50 and terminates any signal on T1 line 51 thereby conditioning gates 118 to pass any signals appearing on lines 116 through lines 121 to register 123. The signals on output lines 120 from the positions in register 123 which have bits stored in them are applied to AND gates 122 and inverters 124.

If there has been no change at any of the terminals being monitored so that all of the samples on lines 72 are the same as all of the bits applied to lines 110, there are no bits on any of the lines 120 and inverters 124 are generating output signals on all of the lines 170. The combined occurrence of signals on all of the lines 170 and a signal on T1 line 51 fully conditions AND gate 175 to generate an output signal on line 180 which signal is applied through OR gate 186 to line 60. The signal on line 60 conditions gates 74, 86, 94 and 102 to shift the new set of samples on lines 72 into register II and to shift the contents of registers II, III, IV, and V one position down. The contents of register V are shifted out of the system. The signal on line 60 is also applied to restart clock 50 and to shift buffer storage register 64 and buffer address register 68 to the right.

If there are pulses on one or more of the lines 120, meaning that the samples on lines 72 for the terminals are different from the state stored for the corresponding terminals in LSSR108, these signals are applied as one input to corresponding ones of the AND gates 122. Not-equal circuit 132 makes a determination as to whether the contents of registers III, IV, and V for the various terminals are the same. For such terminals as the contents of these three registers are not the same, a signal appears on the corresponding line 138. By T2 time, such of the AND gates 122 have signals applied to them by both a line 120 and a line 138 and generate an output signal on a line 140. If none of the AND gates 122 have inputs applied to them by both a line 120 and a line 138, then there are 0 bits on all of the lines 140 and inverters 144 generate output signals on all of the output lines 171. The presence of signals on all of the lines 171 in conjunction with a signal on T2 line 52 fully conditions AND gate 176 to generate an output signal on line 181 which is applied through OR gate 186 to beforementioned line 60. Therefore, if all of the terminals which failed the first test pass the second test, the cycle may also be prematurely terminated.

Any signal on a line 140 at this time is applied to condition one of the AND gates 142. At this same time, the lines from the corresponding terminal positions in registers II, III, IV, and V are applied to even-circuit 128. Any of these circuits which have an even number of 1 bits or 0 bits applied to them generate an output signal on the corresponding line 146. Such of the AND gates 142 as have inputs on their lines 140 and 146 generate output signals on line 148. If all of the terminals which failed the second test pass the third test, then nothing will appear on any of the lines 148 and all of the inverters 150 will generate output signals on lines 172 which, in conjunction with the signal on T3 line 53, fully condition AND gate 177 to generate an output signal on line 182 which is applied through OR gate 186 to beforementioned line 60. It is therefore seen that if, at any stage in the operation, a majority logic test is passed by all terminals, further operations are not performed and the circuit proceeds immediately to look at the next set of samples. This capacity in conjunction with buffer store 64 may permit terminal sampling rate to be somewhat higher than the cycling rate of the receiver circuit. Since most samples indicate no change has occurred, the circuit of this invention could have enough prematurely terminated cycles to be able to keep pace with a higher terminal sampling rate.

At the end of T3 time, there are signals on such of the lines 148 as correspond to terminals which have failed all three of the tests. These are the terminals for which a majority of the samples are now different from the sample stored in LSSR108. The fact that this is true may be verified by noting that, if there is an output from an even-circuit 128, it means that there are either two 0's and two 1's in the corresponding positions in registers II, III, IV, and V or that there are all 0's or all 1's in these four registers. Since a not-equal output is generated by circuit 132, the latter of these possibilities is eliminated, meaning that if the samples for a terminal fail tests 2 and 3, then corresponding positions of registers II, III, IV, and V contain the same number of 1 bits and 0 bits. Therefore, to satisfy the majority condition, the majority of the samples for the terminal in question is the same as that being applied to the line 72 for that terminal. But the failure of test 1 indicates that the state on the line 72 is different from that stored in LSSR108 for that terminal. Therefore, the new majority condition determined for that terminal is different from that stored in LSSR, and the contents of LSSR for that terminal must be altered.

The altering of the contents of LSSR is accomplished by applying the signals on the lines 148 to one input of AND gates 152. At T4 time, these AND gates are fully conditioned to pass bits onto the lines 154 corresponding to the terminals which have had their state altered. These signals are applied as one input to not-equal circuit 112, the other input to this circuit being the contents of LSSR110. It can be seen that if the contents of a given position in LSSR are a 0 and there is a 1 bit on line 154 for the corresponding terminal, indicating a desire for a change, a 1 bit will appear on the corresponding output line 156, causing the desired 1 bit to be stored in LSSR. Similarly, if there is a 1 bit in LSSR and it is desired to change it to a 0 bit, the signals on lines 110 and 154 for that terminal will result in no output on the corresponding line 156, permitting the desired 0 bit to be stored in LSSR. If there is a 0 bit on a line 154, the output on the corresponding line 156 is the same as the signal appearing on the corresponding line 110. There is therefore no change in the state of the corresponding position in LSSR. The contents of LSSR108 are therefore updated at T4 time.

The signals on lines 148 are also applied as one set of conditioning inputs to gates 78 and as a set of inputs to AND gate 114. Any AND gate 114 which has both a signal applied to it on line 148 and a signal applied to it on an output line 110 from LSSR108 corresponds to a terminal which has just had its state changed from a 0 to a 1. It will be remembered from the beginning of this section that these are the only terminals for which it is desired to obtain output signals on line 164. when there is a signal on T5 line 55 and no signal on T6 line 56, the AND gates 114 which have this combination of inputs are fully conditioned to generate the desired output signals on lines 164.

Gates 78 are used in performing the two-cycle inhibit function of circuit 40 in FIG. 1. At T6 time, such of the gates 78 as correspond to terminals which have had their contents changed (i.e. terminals for which there is a signal on a line 148) are conditioned to pass the new contents of these terminals into registers II and III. Inverter 163 being an input to AND gates 114 prevents this change in the contents of registers II and III for effecting the circuit output. At T7 time, a signal is applied through OR gate 186 to line 60, conditioning gates 74, 86, 94, and 102 to shift the samples stored on lines 72 and in registers II, III, IV, and V one position down. The effect of this operation in conjunction with the previous setting of the changed bits on lines 72 into registers II and III is to insure that the contents of registers II, III, and IV for the next cycle are the same, thereby effectively inhibiting a signal from appearing on line 148 for that terminal. It can further be seen that during the next sample cycle, the contents of registers III, IV, and V will be the same, likewise inhibiting a signal from appearing on line 148 for that terminal. The objective of inhibiting a change in the contents of LSSR108 and an output on line 164 for the terminal in question for the following two sample cycles after a change has been detected is therefore effected.

The signal on line 60 is also applied to restart clock 48, to shift a new set of samples into the right-most position of shift register 64, and to shift buffer address register 68 to the right. The circuit is thus set to commence a new sample cycle.

Since the circuit shown in FIG. 3 operates with majority logic and has the two-cycle inhibit feature following each detection of a change in state at a terminal, it will operate to distinguish between signal and noise on a signal of the type shown in FIG. 2 in the same manner as that described in conjunction with FIG. 1. A description of this sequence of operations will therefore not be repeated here.

While in the embodiment of the invention shown in FIG. 3 the majority determination has been made by three tests and the two-cycle inhibit function has been implemented by altering the state of two registers so as to effectively force a successful comparison for the following two sample cycles, either of these functions may be implemented in a variety of other fashions. Suitable circuitry may, for example, be provided to implement the majority logic determination with a single test. Likewise, the inhibit function may be implemented by providing an additional input to gate 118 or AND gates 122, or 142, which input is deactivated for two sample cycles after a change is detected.

Several of the assumptions which were made in the design of the circuit shown in FIG. 3 are likewise not critical to the invention. For example, while 3-out-of-5 majority logic has been employed in the embodiment of FIG. 3, 2-out-of-3, 4-out-of-7, 5-out-of-9, etc. majority logic might be employed. The choice of which majority logic scheme is employed depends on the degree of accuracy which is required. With a 2-out-of-3 scheme, only a 33% error may be tolerated, whereas with a 3-out-of-5 scheme up to a 40% error may be tolerated and with a 4-out-of-7 scheme up to a 43% error may be tolerated. Additional samples result in very small increments in the permissible percentage of error. It should also be noted that the decision circuit may operate on other than a majority basis. For example, a decision may be made on the basis of 3-out-of-4 samples or 5-out-of-7 samples. The number of sampling cycles during which a change determination is suppressed will depend in part on the logic scheme employed and in part on a trade-off between circuit complexity and a desire for absolute noise rejection ability. If the detection is suppressed for $(M+1)/2$ sample cycles, where M is the base of the majority logic scheme employed, the circuit is capable of giving meaningful results under the worst possible noise conditions for the tolerable noise percentage indicated above (i.e. alternate 1 and 0 samples for a sustained period of time or in other words, total ambiguity). However, for any normal noise condition, suppression for $(M-1)/2$ sample cycles gives accurate results. With a 3-out-of-5 majority logic scheme, $(M-1)/2$ is equal to two (this being the circuit shown in FIG. 3), and $(M+1)/2$ becomes three.

For the embodiment of the invention shown in FIG. 3, an output was desired on the line 164 for a given channel only when there was a change from a 0 to a 1 level at the corresponding terminal. If, for example, an output had instead been required for any level change at the terminal, lines 158 could have been used as the circuit output lines. Other output criteria could similarly be implemented.

It should also be pointed out that the number of terminals being monitored is not critical. In FIG. 1, only a single input channel has been shown, whereas in FIG. 3, the number of input channels has been left purposefully vague and may in fact be any number from one on up. Also, while inputs have been applied to buffer storage 64 in parallel, it is possible that a single line 62 could be provided and the bits read in succession into the appropriate positions of the level indicated by BAR68 under control of another register not shown.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A noise-rejecting receiver for a data transmission system comprising:
- means for applying samples of the transmitted data to said receiver;
- means for storing each of the N most recent samples applied to said receiver;
- means for storing the last stable state which is determined for said transmitted data;
- means operative after each of said samples is applied to said receiver for determining the state of a predetermined fraction of said applied sample and said N stored samples;
- means operative after said above mentioned means for determining if the state of said predetermined fraction of the samples is different from said last stable state; and
- means responsive to a determination that said predetermined fraction of the samples is different from said last stable state for storing the state of said predetermined fraction of the samples in said last stable state storing means, and for inhibiting said determination responsive means as a predetermined number of subsequent samples are applied to said receiver.

2. A noise-rejecting receiver for a data transmission system comprising:
- means for applying samples of the transmitted data to said receiver;
- means for storing each of the N most recent samples applied to said receiver;
- means for storing the last stable state which is determined for said transmitted data;
- means operative after each of said samples is applied to said receiver for determining the state of a majority of said applied sample and said N stored samples;
- means operative after said above mentioned means for determining if the state of said majority of the samples is different from said last stable state; and
- means responsive to a determination that said majority of the samples is different from said last stable state for storing the state of said majority of the samples in said last stable state storing means, and for inhibiting said determination responsive means as a predetermined number of subsequent samples are applied to said receiver.

3. A receiver of the type described in claim 2 wherein said predetermined number is $N/2$.

4. A receiver of the type described in claim 2 wherein said predetermined number is $(N/2)+1$.

5. A noise-rejecting receiver for a data transmission system comprising:

means for applying samples of the transmitted data to said receiver;

means for storing each of the N most recent samples applied to said receiver;

means for storing the last stable state which is determined for said transmitted data;

means operative after each of said samples is applied to said receiver for determining the state of a majority of said applied sample and said N stored samples;

means operative after said above mentioned means for determining if the state of said majority of the samples is different from said last stable state; and means responsive to a determination that said majority of the samples is different from said last stable state for storing the state of said majority of the samples in said last stable state storing means and for causing the state of a majority of the samples looked at by said state determining means to be the same as the state stored in said last stable state storing means as a predetermined number of new samples are applied to said receiver whereby said determination responsive means is effectively inhibited.

6. A noise-rejecting receiver for a data transmission system wherein data from a plurality of terminals is being multiplexed comprising:

means for applying samples of the transmitted data from each of the terminals being monitored to said receiver;

means for storing the N most recent samples received from each of said terminals;

means for storing the last stable state which is determined for the transmitted data for each of said terminals;

means operative after each set of samples is applied to said receiver for determining for each of said terminals the state of a majority of said applied samples and said N stored samples;

means operative after said above mentioned means for determining if the state of a majority of the samples for any of said terminals is different from the last stable state stored for that terminal; and means responsive to a determination that the majority of the samples for a given terminal are different from the last stable state stored for that terminal for storing the state of said majority of the samples in the position in said last stable state storing means for the given terminal and for inhibiting said determination responsive means from operating on samples from said given terminal as a predetermined number of subsequent samples are received from that terminal.

7. A device of the type described in claim 6, including means for prematurely terminating the operation of the receiver once a determination has been made that the majority of the samples for all of said terminals are the same as the states stored in said last stable state storing means for said terminals.

8. A noise-rejecting receiver for a data transmission system comprising:

means for applying samples of the transmitted data to said receiver;

means for storing the N most recent samples applied to said receiver;

means for storing the last stable state which is determined for said transmitted data;

means operative after each of said samples is applied to said receiver for performing three separate tests, which tests include: determining if the state of said applied sample is the same as that stored in said last stable state storing means, determining whether the oldest $N-1$ of the stored samples are the same, and determining whether the state of an odd number of said N stored samples are the same; and means responsive to the failing of all three of said tests for causing the state of said applied samples to be stored in said last stable state storing means and for inhibiting further changes in the state of said last stable state storing means as a predetermined number of new samples are applied to said receiver.

9. A noise-rejecting receiver for a data transmission system comprising:

means for applying samples of the transmitted data to said receiver;

means for storing the N most recent samples applied to said receiver;

means for storing the last stable state which is determined for said transmitted data;

means operative after each of said samples is applied to said receiver for performing three separate tests, which tests include: determining if the state of said applied sample is the same as that stored in said last stable state storing means, determining whether the oldest $N-1$ of the stored samples are the same, and determining whether the state of an odd number of said N stored samples are the same;

means responsive to the passing of one of said tests for inhibiting further operation of the circuit and for causing a new sample to be applied to said receiver; and means responsive to the failing of all three of said tests for causing the state of said applied sample to be stored in said last stable state storing means and for inhibiting further changes in the state of said last stable state storing means as a predetermined number of new samples are applied to said receiver.

10. A noise-rejecting receiver for a data transmission system comprising:

means for applying samples of the transmitted data to said receiver;

means for storing the N most recent samples applied to said receiver;

means for storing the last stable state which is determined for said transmitted data;

means operative after each of said samples is applied to said receiver for performing three separate tests, which tests include: determining if the state of said applied sample is the same as that stored in said last stable state storing means, determining whether the oldest $N-1$ of the stored samples are the same, and determining whether the state of an odd number of said N stored samples are the same;

means responsive to the passing of one of said tests for inhibiting further operation of the circuit and for causing a new sample to be applied to said receiver;

means responsive to the failing of all three of said tests for causing the state of said applied sample to be stored in said last stable state storing means; and in the means for storing $N/2$ most recent samples whereby the circuit is forced to pass said three tests as the next $N/2$ samples are applied to said receiver.

11. A noise-rejecting receiver for a data transmission system comprising:

means for applying samples of the transmitted data to said receiver;

means for storing the 4 most recent samples applied to said receiver;

means for storing the last stable state which is determined for said transmitted data;

means operative after each of said samples is applied to said receiver for performing three separate tests, which tests include: determining if the state of said applied sample is the same as that stored in said last stable state storing means, determining whether the oldest 3 of the stored samples are the same, and determining whether the state of an odd number of said 4 stored samples are the same;

means responsive to the passing of one of said tests for inhibiting further operation of the circuit and for causing a new sample to be applied to said receiver;

means responsive to the failing of all three of said tests for causing the state of said applied sample to be stored in said last stable state storing means; and in the means for storing the 2 most recent samples whereby the circuit is forced to pass said three tests as the next 2 samples are applied to said receiver.

12. A noise-rejecting receiver for a data transmission system comprising:

means for applying samples of the transmitted data to said receiver;

means for storing the N most recent samples applied to said receiver;

means for storing the last stable state which is determined for said transmitted data;

means operative after each of said samples is applied to said receiver for performing a first test to determine if the state of said applied sample is the same as that stored in said last stable state storing means;

means responsive to an indication that the states in the above tests are different for performing a second test to determine whether the oldest $N-1$ of the stored samples are the same;

means operative in the event that a determination is made that the states of the $N-1$ oldest stored samples are not the same for performing a third test to determine whether the state of an odd number of said N stored samples are the same; and means operative in the event that the state of an even number of said stored samples are the same for causing the state of said applied sample to be stored in said last stable state storing means and for inhibiting further changes in the state of said last stable state storing means as a predetermined number of new samples are applied to said receiver.

13. A device of the type described in claim 12 including means responsive to the circuit passing any one of said three tests for inhibiting further operation of the circuit and for causing a new sample to be applied to said receiver.

14. A noise-rejecting receiver for a data transmission system wherein data from a plurality of terminals is being multiplexed comprising:

means for applying samples of the transmitted data from each of said terminals to said receiver;

means for storing the N most recent samples from each of said terminals;

means for storing the last stable state which is determined for the transmitted data from each of said terminals;

means operative after each set of said samples is applied to said receiver for performing three separate tests on the samples from each terminal, which tests include: determining if the state of the applied sample for the terminal is the same as that stored for that terminal in said last stable state storing means, determining whether the oldest $N-1$ of the stored samples for the terminal are the same, and determining whether the state of an odd number of said N stored samples for the terminal are the same;

means responsive to the passing of at least one of said tests by the samples from all of said terminals for inhibiting further operation of the circuit and for causing a new set of samples to be applied to said receiver; and means responsive of all three of said tests by the samples from a terminal for causing the state of the applied sample from that terminal to be stored in the position in said last stable state storing means for that terminal and for inhibiting further changes in the state of that position of said last stable state storing means as a predetermined number of new sets of samples are applied to said receiver.

No references cited.

ROBERT C. BAILEY, *Primary Examiner.*

PAUL J. HERON, *Examiner.*

R. RICKERT, *Assistant Examiner.*